(No Model.)
T. W. & B. T. WOOD.
MILK AERATOR.
No. 487,413. Patented Dec. 6, 1892.
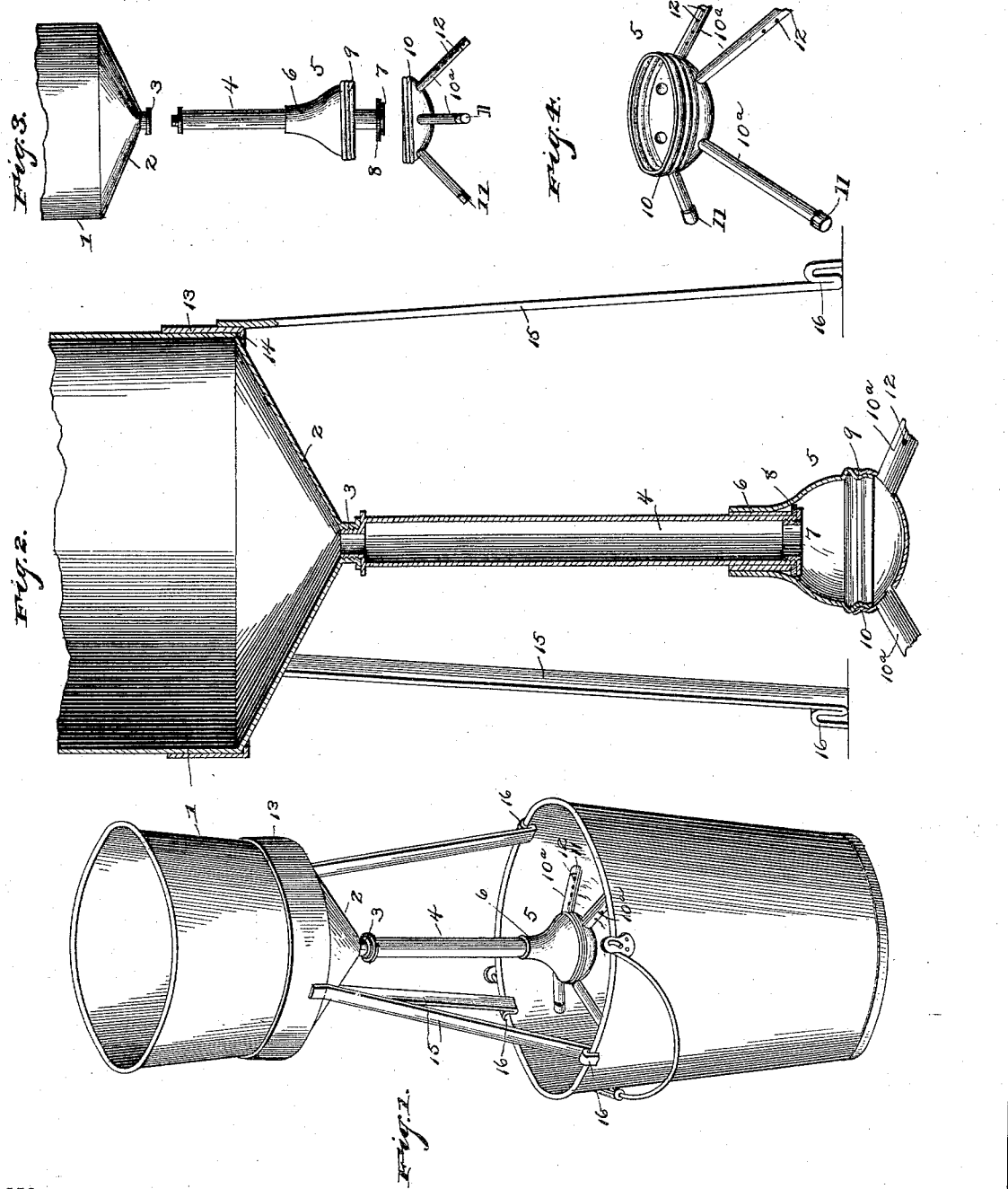

UNITED STATES PATENT OFFICE.

THOMAS W. WOOD AND BERTINI T. WOOD, OF BERLIN, WISCONSIN.

MILK-AERATOR.

SPECIFICATION forming part of Letters Patent No. 487,413, dated December 6, 1892.

Application filed April 7, 1892. Serial No. 428,158. (No model.)

*To all whom it may concern:*

Be it known that we, THOMAS W. WOOD and BERTINI T. WOOD, citizens of the United States, residing at Berlin, in the county of Green Lake and State of Wisconsin, have invented a new and useful Milk-Aerator, of which the following is a specification.

This invention relates to a milk-aerator; and it consists in the construction and arrangement of the parts thereof, as will be more fully hereinafter described and claimed.

The object of this invention is to provide superior means for abstracting the animal heat from milk by causing it to be thrown into the atmosphere in the form of a spray, so that the air may intersect the same and carry off the said heat.

In the drawings, Figure 1 is a perspective view of the improved device shown in position on a pail. Fig. 2 is a section of the aerating attachment shown disconnected from the pail and the parts thereof enlarged. Fig. 3 is a side elevation of the parts detached from each other. Fig. 4 is a detail perspective view of one of the parts.

Similar numerals of reference indicate corresponding parts in the several views.

Referring to the drawings, the numeral 1 designates a receptacle of preferred form and material, having a conical bottom 2, with a screw-nipple 3 projecting from the central portion thereof to form a feed-opening, as will be readily understood. To the said nipple 3 is removably secured the upper screw-threaded end of a tube or pipe 4, having its lower end fitted into a head 5. The said head 5 is constructed in two sections, the uppermost of which has a collar 6, loosely fitting around the pipe or tube 4, and on the end of the said pipe or tube 4 is removably secured a screw-collar 7, which bears against the upper part of the head when the device is in operative position; but when it is desired to disconnect the said upper part of the head from the said pipe or tube the screw-collar 7 is removed and this operation readily accomplished. The said screw-collar supports a gasket 8, which is adapted to bear against the upper portion of the said head for an evident purpose. The lower part of the upper section of the head is formed with screw-threads 9, adapted to be engaged by screw-threads 10, formed in the upper edge of the lower section of said head. By this removability of parts they are readily adapted to be cleansed when desired, and which is essentially necessary in devices of this character. The lower portion of the head 5 has a series of tubular arms $10^a$, radiating therefrom at an angle of inclination and open into said portion of the head, but have their outer ends closed with a screw-cap, as at 11. The alternate sides of the said arms $10^a$ have a series of apertures or openings 12 therein, through which the milk escapes in the form of a spray or fine stream. Owing to the loose connection of the upper portion of the head with the pipe or tube 4, and consequently of the entire head when the sections are connected, a free rotation of the head is permitted.

When it is desired to disconnect the parts set forth, and especially to remove the head 5 from the tube 4 for the purpose of cleansing the parts, the said head 5 may be slid upward on the tube 4, as shown in Fig. 3, in order that the collar 7 may the more readily be disconnected from the lower end of said tube 4, and thereby permit a withdrawal of the said head from the said tube. Afterward the said tube 4 may be as readily disconnected from the conical bottom of the receptacle by the construction heretofore set forth. As the milk descends through the pipe or tube 4 into the said head 5 and passes out through the arms $10^a$ and exits through the openings 12 thereof, the said head is caused to rotate on the tube or pipe 4 by virtue of the centrifugal action produced by the milk escaping from the arms $10^a$, and thereby the milk is thrown into a fine spray and extended over a larger surface, with which the air intermingles and abstracts the animal heat.

The receptacle 1 is adapted to be fitted in a rim 13, having a lower interior flange 14, on which the said receptacle rests, and also provided with legs 15, having lower looped feet 16 to take over the rim of a pail, milk-pan, or other suitable receptacle. By this means the device is removably supported and may be readily transferred from one vessel or receptacle to another.

The advantages and conveniences arising from the construction heretofore set forth are readily apparent to those skilled in the art, and, being of a manifold nature, need not be further enlarged upon herein.

Having thus described the invention, what is claimed as new is—

In a milk-aerator, the combination of a receptacle having a tube depending therefrom and detachably connected thereto and provided with a removable collar on the lower end thereof, a separable head loosely and rotatably mounted on the lower end of said tube, the upper part of said head being adapted to be slid upward on the said tube to allow the said collar to be removed and limited in its downward movement by the collar when the latter is secured in position on the lower end of the tube, and arms radially extending from the lower portion of said head at a downward angle of inclination and provided with apertures or openings in alternate sides thereof and having the outer ends of the same closed, the said head being separable and adjustable to provide for cleansing the several parts of the device, substantially as described.

In testimony that we claim the foregoing as our own we have hereto affixed our signatures in the presence of two witnesses.

THOMAS W. WOOD.
BERTINI T. WOOD.

Witnesses:
JOHN J. WOOD, Jr.,
GEORGE B. HEANEY.